July 24, 1962 P. H. WINSLOW 3,046,415

PRIORITY SWITCHING CIRCUIT

Filed Nov. 29, 1957

INVENTOR
PAUL H. WINSLOW
BY F. D. Sullivan
ATTORNEY

United States Patent Office 3,046,415
Patented July 24, 1962

3,046,415

PRIORITY SWITCHING CIRCUIT

Paul H. Winslow, Stow, Mass., assignor, by mesne assignments, to Sylvania Electric Products Inc., Wilmington, Del., a corporation of Delaware Filed Nov. 29, 1957, Ser. No. 699,782
2 Claims. (Cl. 307—88.5)

This invention is concerned with electronic switching systems, and particularly with an improved means for establishing priority and control among a plurality of parallel channels in such systems.

In many communications networks (e.g. military command nets) it is desirable that several input circuits feed a common output, such as a transmitter. One of the engineering considerations in such arrangements is establishment of priority among the various inputs to prevent the confusion resulting from simultaneous operation. Hitherto, this has been accomplished by the use of relays which are actuated to open the circuit of other channels when a priority channel is being used.

Although relays give rather satisfactory results for this purpose, they have inherent deficiencies which impose limitations on the systems in which they are employed. Among their drawbacks are relatively slow operating response, cost, bulk, and constant maintenance problems such as checking the contact points for corrosion, etc.

Accordingly, the principal object of the present invention is to provide a priority switching system which will have faster response, be lighter and more compact, and more reliable and trouble-free in operation than those currently in use. A more specific object is to provide for electronic, as distinguished from electromagnetic or mechanical switching among a plurality of communication channels.

These objectives are accomplished in a preferred embodiment of the invention with a novel switching circuit which features a plurality of input channels with a common output, each input channel having an associated D.C. bias of a different magnitude, and an arrangement of diodes so polarized as to enable back bias to block the signal from the lower priority channels when a higher priority channel is operated. Other embodiments and modifications will be apparent to those skilled in the art from the following description and the accompanying drawings, in which.

Figures 1, 2:
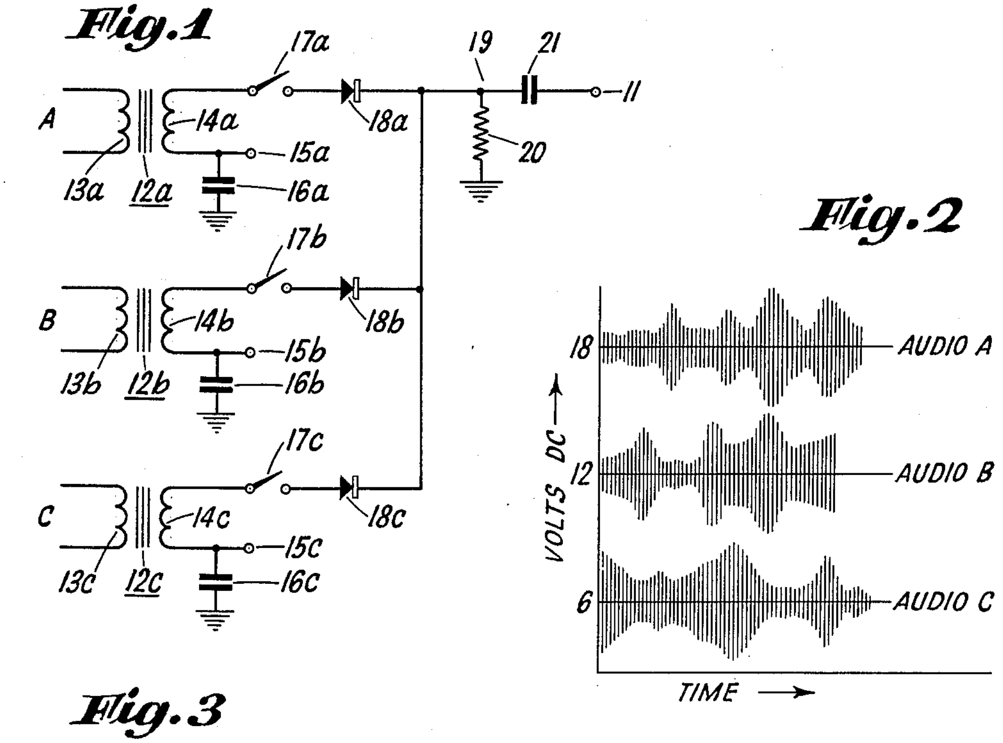
FIG. 1 is a schematic diagram of a priority switching circuit according to the invention.
FIG. 2 is a diagrammatic representation of voltages applied to the circuit of FIG. 1; and, FIG. 3 is a schematic diagram of a modification of the system of FIG. 1.

The switching circuit represented in FIG. 1 comprises three audio inputs A, B, and C and a common output 11 which may be the input to a transmitter. It is to be understood that the illustration of three inputs is by way of example only. Each of the inputs includes a transformer 12 having a primary winding 13 and a secondary winding 14. One terminal of the secondary winding 14 is connected to a D.C. voltage source 15 and, through audio bypass capacitor 16, to ground. Its other terminal is connected through a press-to-talk switch 17 and a diode 18 to a common terminal point 19 which is in turn connected, through resistor 20, to ground and, through capacitor 21, to the load at output terminal 11.

The input channels A, B, and C are all similar. Consequently, their identical component elements are designated in the drawing by the same reference character with a suffix *a*, *b*, or *c* to correspond with the particular channel in which they are located.

In the arrangement shown, +18 volts D.C. is applied at terminal **15*a*, +12 volts D.C. at 15*b*, and +6 volts D.C. at 15*c***. Audio signals applied at the respective input transformer primaries modulate these three voltage levels in the manner shown diagrammatically in FIG. 2.

The circuit enables audio channel A, B, or C to drive a common transmitter, amplifier, or other device having its input connected to terminal 11, and automatically establishes priority among the channels. In the system illustrated, channel A takes precedence over channels B and C; and channel B takes precedence over channel C. This priority results because closing the press-to-talk switch of a higher priority channel applies the relatively high D.C. voltage associated with that channel to the diode, or diodes, 18 associated with the lower priority channels to back bias them in a manner which will effectively block signal transmission from these channels. A more detailed explanation of the operation of the circuit follows.

Any one of the three channels A, B, or C can be utilized to provide an input to the device connected to terminal 11. Thus, when the switch **17*c* is closed, the audio modulation applied through transformer 12*c* to the +6 volts D.C. at terminal 15*c* is conducted through diode 18*c* via common connecting point 19 to terminal 11**.

If, while channel C is in use, press-to-talk switch **17*b* is closed, the +12 volts at terminal 15*b* is applied, through diode 18*b*, to back bias diode 18*c* with a more positive voltage than the +6 volts applied at terminal 15*c*. This, in effect, opens the input circuit of channel C at diode 18*c* and blocks its signal. The audio modulation via transformer 12*b* applied to the +12 volts coming from terminal 15*b* thus becomes the input conducted through common connection 19 to terminal 11**.

Similarly, if press-to-talk switch **17*a* is closed while either channel B or channel C is in operation, the +18 volts applied at terminal 15*a* back biases the diodes 18 associated with the lower priority channels and blocks their signal output while the audio modulation applied through transformer 12*a* to this higher biasing voltage becomes the output signal via terminal 11**.

As shown in FIG. 2, the separation between the levels of D.C. bias for the different channels should provide enough spread to accommodate the upper and lower limits of the audio modulation applied; e.g. the upper peak of modulation applied to channel B should not reach the same level as the lowest modulation of channel A, and its lowest limits should not reach the highest peak of modulation of channel C. Such separation prevents interference between channels and insures that higher priority channels will effectively block lower priority channels during the entire period that the press-to-talk switch of the higher priority channels is closed. The six, twelve, and eighteen volt levels suggested give satisfactory results for a given degree of modulation, but other levels of bias may be uesd to accord with other limits of modulating signals.

Values for resistor 20 and capacitor 21 are chosen to provide a proper impedance match for the load connected to terminal 11 and yet provide a sufficiently short RC time constant to be adequately responsive to switching amongst the various input channels at a rate, for example, of approximately 1/10 of a second. 500K ohms for resistor 20 and .1 microfarad for condenser 21 are suggested for satisfactory operation in an audio amplifying circuit.

Figure 3:
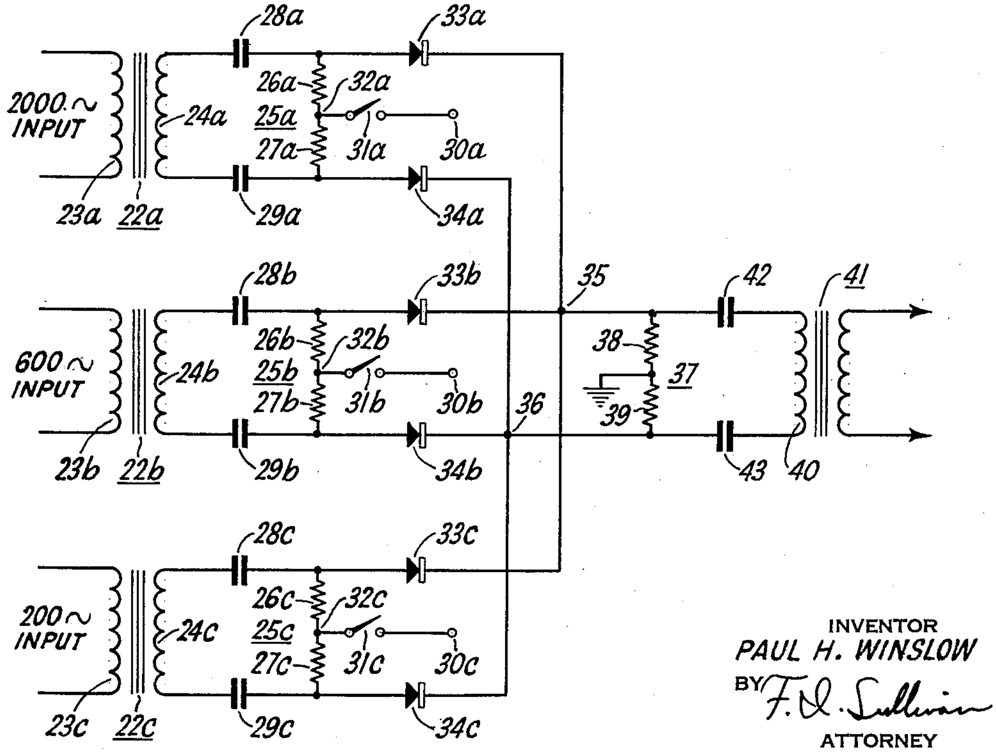

FIG. 3 shows a balanced system as opposed to the single-ended arrangement of FIG. 1. In this modification, input channels A, B, and C feature audio transformers 22 having input windings 23 and output windings 24. Center-tapped voltage dividers 25 comprising resistors 26 and 27 are connected across the output windings 24 and are D.C. isolated therefrom by capacitors 28 and 29. D.C.

biasing voltage at terminal 30 is applied, via press-to-talk switch 31 to the center-tap 32 of voltage divider 25. In both modifications of the invention the different levels of bias applied to each channel may be derived from independent batteries, from separate reference points along a voltage divider across a rectified and filtered A.C. power source, or any other convenient reference voltage.

The D.C. voltage at terminal 30, modulated by the output of transformer 22, is fed, through diodes 33 and 34, to common terminal points 35 and 36 which are connected to either end of a voltage divider 37, comprising resistors 38 and 39, and is center tapped to ground. The primary winding 40 of an output transformer 41 is connected across the voltage divider 37 and is D.C. isolated therefrom by capacitors 42 and 43. This balanced system utilizes the same diode switching principle as the circuit of FIG. 1, but it is free of transient voltages resulting from the operation of the press-to-talk switches and is more suitable for certain types of audio circuits, especially where long transmission lines are employed.

As with the circuit of FIG. 1, +18 volts D.C. may be applied to terminal 30*a* to give first priority to channel A, +12 volts to terminal 30*b* to provide second priority for channel B, and +6 volts D.C. to terminal 30*c* to give third priority to channel C. The circuit operates similarly to the one previously described, with the higher value D.C. back biasing the diodes associated with the lower priority channels in order to effectively block their signals, the difference being that in this modification two diodes are employed, one in each of the balanced lines.

In the circuit schematically presented in FIG. 3, satisfactory results in an audio system have been obtained with components having the following identification and value:

| | | |
|---|---|---|
| Resistors 26 and 27 | ohms | 2K |
| Capacitors 28 and 29 | microfarads | 2 |
| Diodes 33 and 34 | | IN362 |
| Resistors 38 and 39 | ohms | 39K |
| Capacitors 42 and 43 | microfarads | 4 |

An additional modification shown in connection with the circuit of FIG. 3 involves the introduction of different frequency signals to the audio input of the different channels for testing purposes (the combination of a 2000 cycle tone for channel A, 600 for channel B, and 200 for channel C is suggested). The different tone signals make it possible to identify the particular channel connected to the output at any given time and also to detect leakage of a lower priority input into the system when a higher priority should be controlling.

The preferred embodiment and modifications described are useful in multi-input, single output, audio communication systems such as military command sets, telephone, etc. Such description has been intended by way of illustration, however, and not as a limitation. The invention can also be used as a basis for assigning frequency or wave form priorities, to provide for priority switching among coded and other forms of intelligence, and to establish other controls. It is limited only by the scope of the appended claims.

What is claimed is:

1. In a communication system having a plurality of input channels and a common output, means for assigning priority among input channels which comprises: an input transformer having a primary and a secondary winding for each channel; means for applying a modulating signal having positive and negative limits to the primary winding of each of said transformers; means for applying a direct current biasing voltage of the same polarity but a different magnitude to the secondary winding of each of said transformers, the magnitudes of each biasing voltage having greater separation than the voltage swing between positive and negative limits of the modulating signals concerned; a switch respective to each channel coupling its transformer secondary winding to said common output; and a unidirectional conducting device connected in series with each switch, each of said conducting devices being polarized for positive current flow toward said common output.

2. A communications system having an output transformer with a balanced two line input and a plurality of balanced two line channels all connected in parallel across said input, each of said channels comprising: two conductors, a resistor network connected across said conductors; means for applying direct current of the same polarity but a different voltage level for each of said channels through said network to said conductors; transformer means for modulating said direct current; switching means controlling the flow of current from said channel; and a unidirectional conducting device serially connected to each of said conductors, said devices being polarized for electric current flow from said channel to said balanced input.

References Cited in the file of this patent

UNITED STATES PATENTS

| | | |
|---|---|---|
| 2,541,039 | Cole | Feb. 13, 1951 |
| 2,636,133 | Hussey | Apr. 21, 1953 |
| 2,658,142 | St. John | Nov. 3, 1953 |
| 2,760,087 | Felker | Aug. 21, 1956 |
| 2,817,079 | Young | Dec. 17, 1957 |
| 2,854,504 | Lawrence | Sept. 30, 1958 |
| 2,877,451 | Williams | Mar. 10, 1959 |
| 2,894,214 | Touraton | July 7, 1959 |
| 2,964,708 | Steele | Dec. 13, 1960 |